(12) United States Patent
Neag et al.

(10) Patent No.: US 9,073,411 B2
(45) Date of Patent: Jul. 7, 2015

(54) RELEASABLY MOUNTED AUTOMOTIVE WINDSHIELD

(71) Applicants: Dorinel Neag, Commerce Township, MI (US); Carl Mather, Lake Orion, MI (US); Deyan Ninov, Royal Oak, MI (US)

(72) Inventors: Dorinel Neag, Commerce Township, MI (US); Carl Mather, Lake Orion, MI (US); Deyan Ninov, Royal Oak, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/032,743

(22) Filed: Sep. 20, 2013

(65) Prior Publication Data

US 2015/0084363 A1    Mar. 26, 2015

(51) Int. Cl.
B60J 1/04 (2006.01)

(52) U.S. Cl.
CPC ......................................... B60J 1/04 (2013.01)

(58) Field of Classification Search
CPC ...... B60J 1/004–1/007; B60J 1/04; B60J 1/06
USPC ........... 296/92, 84.1, 187.07; 89/36.07, 36.08
See application file for complete search history.

(56) References Cited

U.S. PATENT DOCUMENTS

| | | | | |
|---|---|---|---|---|
| 798,447 | A * | 8/1905 | Pfleghar | 296/96.21 |
| 1,055,346 | A * | 3/1913 | McQuillan | 296/92 |
| 1,069,955 | A * | 8/1913 | Jookmus | 296/92 |
| 1,121,576 | A * | 12/1914 | Ackerman | 296/92 |
| 1,163,413 | A * | 12/1915 | Kern | 296/92 |
| 1,376,887 | A * | 5/1921 | Johnson | 296/92 |
| 1,537,706 | A * | 5/1925 | Sandgren | 296/92 |
| 1,716,858 | A * | 6/1929 | Landine | 296/92 |
| 1,921,261 | A * | 8/1933 | Potter | 296/92 |
| 2,355,860 | A * | 8/1944 | Hansen | 15/250.3 |
| 6,293,606 | B1 * | 9/2001 | Jarosz et al. | 296/78.1 |
| 7,144,061 | B1 * | 12/2006 | Behm et al. | 296/96.11 |
| 7,165,802 | B1 * | 1/2007 | Flynn | 296/88 |
| 7,810,422 | B2 * | 10/2010 | David et al. | 89/36.08 |
| 8,292,355 | B2 * | 10/2012 | Miller | 296/201 |
| 8,348,327 | B2 * | 1/2013 | Germenot et al. | 296/92 |
| 8,641,093 | B1 * | 2/2014 | Knight | 280/748 |

* cited by examiner

*Primary Examiner* — Gregory Blankenship
(74) *Attorney, Agent, or Firm* — Ralph E Smith

(57) ABSTRACT

In at least one implementation, a releasably mounted windshield assembly for a vehicle having a passenger compartment includes a windshield and a control mechanism. The windshield has an inner surface defining part of the passenger compartment when the windshield is in a first position and the control mechanism is coupled at one end to the vehicle and at its other end to the windshield. The control mechanism includes a pivot that permits the windshield to move relative to the vehicle so that the inner surface of the of the windshield faces the vehicle when the windshield is in a second position.

19 Claims, 4 Drawing Sheets

RELEASABLY MOUNTED AUTOMOTIVE WINDSHIELD

FIELD

The present disclosure relates to an automotive vehicle windshield that is releasably mounted to the vehicle to permit movement relative to the remainder of the vehicle from a first position to a second position.

BACKGROUND

Automotive vehicles typically include a windshield that is transparent to permit passengers to see therethrough and is sealed to a vehicle frame to prevent intrusion into a passenger compartment of debris and fluids like air, rain and snow. In most vehicles, the windshield is fixed in place, usually by mechanical fasteners and adhesive, and is not moveable except to replace the windshield.

SUMMARY

In at least one implementation, a releasably mounted windshield assembly for a vehicle having a passenger compartment includes a windshield and a control mechanism. The windshield has an inner surface defining part of the passenger compartment when the windshield is in a first position and the control mechanism is coupled at one end to the vehicle and at its other end to the windshield. The control mechanism includes a pivot that permits the windshield to move relative to the vehicle so that the inner surface of the of the windshield faces the vehicle when the windshield is in a second position.

In at least one implementation, a releasably mounted windshield assembly for a vehicle having a passenger compartment includes a windshield and a control mechanism. The windshield defines part of the passenger compartment when in a first position and is spaced from the passenger compartment when in a second position. The windshield has an upper portion and a lower portion and side surfaces extending between the upper portion and lower portion. The control mechanism is pivotably connected at one end to the vehicle and pivotably connected at its other end to the windshield to permit the windshield to move relative to the vehicle between its first and second positions so that the upper portion of the of the windshield is closer to the passenger compartment of the vehicle than the lower portion of the windshield when the windshield is in its second position.

In some forms, an inner surface of the windshield may be disposed facing downwardly, toward the vehicle, when the windshield is moved to its second position, spaced from a windshield opening of the vehicle. In at least one implementation, the inner surface of the windshield faces a hood of the vehicle. And the hood may be generally convex while the inner windshield surface is generally concave and at least somewhat complementary to the shape of the hood. This may reduce the extent to which the windshield is visible above the hood of the vehicle when the windshield is stowed in its second position. The outer surface of the windshield may face outwardly both when the windshield is in its first position covering the windshield opening and when the windshield is removed from the windshield opening and in its second position.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
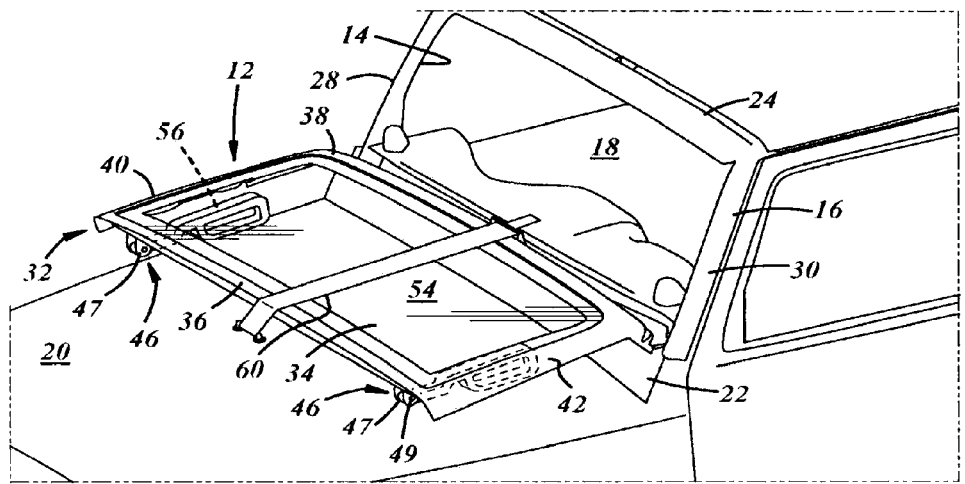
FIG. 1 is a fragmentary perspective view of a vehicle with a releasably mounted windshield shown in a folded down, second position.

Referring in more detail to the drawings, FIG. 1 illustrates a vehicle 10 having a windshield 12 that is releasably mounted in or on an opening 14 of the vehicle. The windshield 12 may be part of an assembly that includes one or more features that permit the windshield to be coupled to and decoupled from a frame 16 that defines the opening 14 of the vehicle 10 and moved relative to the vehicle. In the implementation shown, the windshield 12 may be folded or otherwise moved from a first position wherein it closes the opening 14 to and defines part of a passenger compartment 18 of the vehicle 10 to a second, stowed position at least partially spaced from the opening 14. In the stowed position, the windshield 12 may be received generally parallel and adjacent to a hood 20 of the vehicle 10 so that the passenger compartment 18 is open to the environment through the vehicle windshield opening 14. In the stowed position, the windshield 12 is generally out of the forward view of occupants within the passenger compartment 18.

The vehicle windshield opening 14 may be defined by the frame 16 which mounts the windshield 12 about its periphery. As best shown in FIG. 1, the frame 16 may include a lower member 22 adjacent the hood 20, an upper member 24 adjacent to a vehicle roof 26 and a pair of upright side members 28, 30 extending between the lower and upper members. Elastomeric seals typically are provided on the frame 16 and/or windshield 12 to provide a fluid-tight seal between the windshield and the frame to prevent intrusion into the passenger compartment of things like dirt, pests, or liquids, and to damp vibrations. The opening 14 may be of any desired size and shape and the frame members 22, 24, 28, 30 may be defined by any suitable material or combination of materials (e.g. plastic and metal).

The windshield 12 itself may include a peripheral frame 32 and a transparent pane 34 enclosed by the frame 32. The frame 32 may include lower 36, upper 38 and side edges 40, 42 adapted to be positioned adjacent to the lower 22, upper 24 and side members 28, 30 of the vehicle frame 16 when the windshield 12 is in its first position. While referred to herein as separate members, any two or more, or all of the frame members 36-42 may be generally unitary and formed during a single molding process, if desired. The windshield frame 32 may be molded from any suitable plastic, or formed from metal, as desired. The frame 32 may be arranged to fit snugly against the vehicle frame 16 to securely close the vehicle windshield opening 14, and may provide a fluid tight seal therewith. The transparent pane 34 may be formed from any suitable plastic or glass to permit a view out of the passenger compartment 18 through the windshield 12 when it is in its first position.

In addition to the windshield 12, the windshield assembly also includes a control mechanism 44 that permits the windshield 12 to be moved from its first position to its second position. The control mechanism 44 may include at least one link that is coupled to the windshield 12 and vehicle by a pair of pivots. In one embodiment, a first pivot 46 is provided between the link 44 and the windshield 12 and a second pivot 48 is provided between the link 44 and part of the vehicle 10, such as the vehicle hood 20. The first pivot 46 may be defined by flanges 47 carried by the windshield 12 between which part of the link 44 is received, and a pin 49 extending through the flanges and the link 44. The second pivot may be similarly constructed with flanges 51 coupled to the hood 20 and connected to the link 44 by a pin 53. Of course, other pivoted, hinged or rotating connections can be employed. In the implementation shown, two spaced apart links 44 are provided, with one link adjacent to each side of the windshield 12. In this implementation, the links 44 are spaced apart a distance greater than the width of a transparent portion the windshield so that the links are generally aligned with the side frame members 40, 42 and are shown as being connected to the windshield frame 32. The links 44 may include handles 50 that facilitate manual manipulation of the links 44 and windshield 12. That is, one or more people may grab the handle(s) 50 and rotate the links 44 to move the windshield 12 between its first and second positions.

Figure 2:
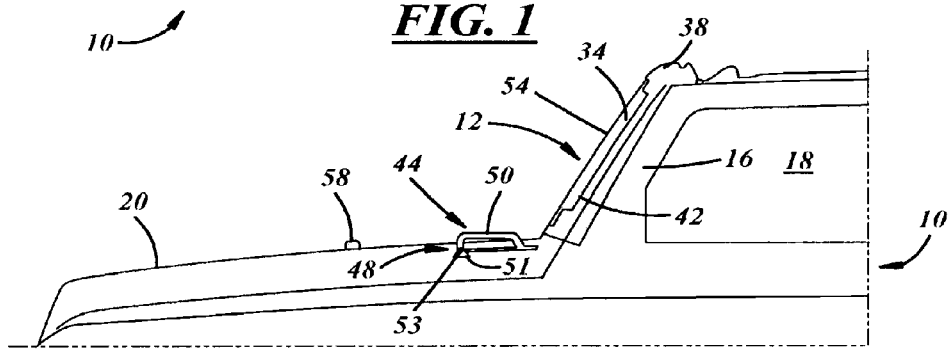
FIG. 2 is a side view of a portion of the vehicle showing the windshield in a first position.
Figure 3:
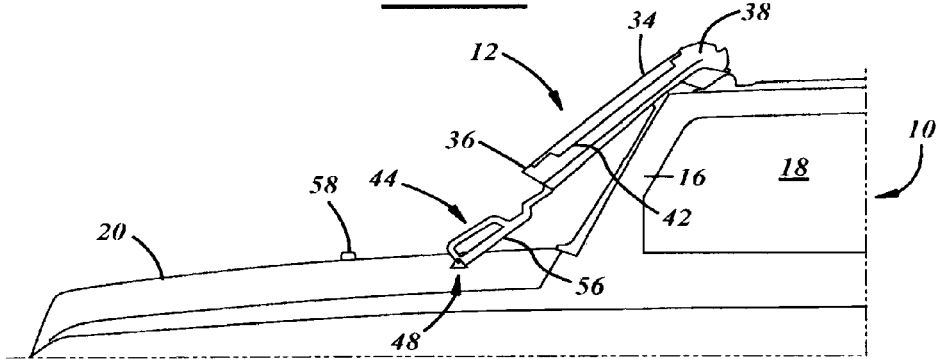
FIGS. 3-5 are side views of a portion of the vehicle showing the windshield released from its first position and being moved between its first and second positions when folding down the windshield.
Figure 4:
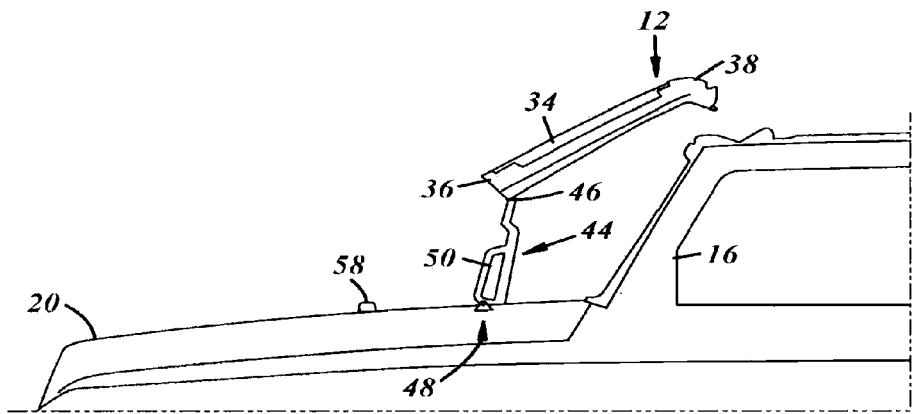
Figure 5:
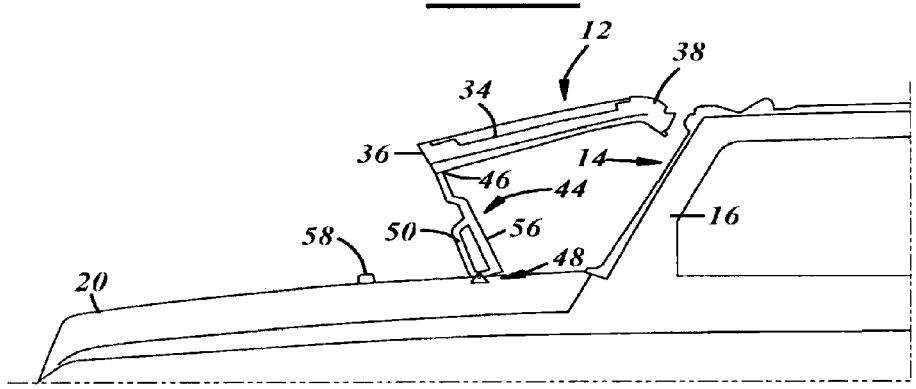

When the windshield 12 is in its first position, as shown in FIG. 2, the windshield frame 32 is secured and sealed to the vehicle frame 16. This is the normal operating position of the windshield 12 and passenger's within the vehicle 10 look through the windshield 12 when facing forward in the vehicle. In this position, the link 44 may be positioned adjacent to the hood 20 so that it is generally out of view from within the passenger compartment 18. Of course, the link 44 could be positioned in a different orientation, such as generally parallel to the windshield 12 or at any other angle, if desired. The links 44 (or other control mechanism) may be located so that at least a majority of the links are outside of the passenger compartment 18 when the windshield is in its first position.

Figure 9:
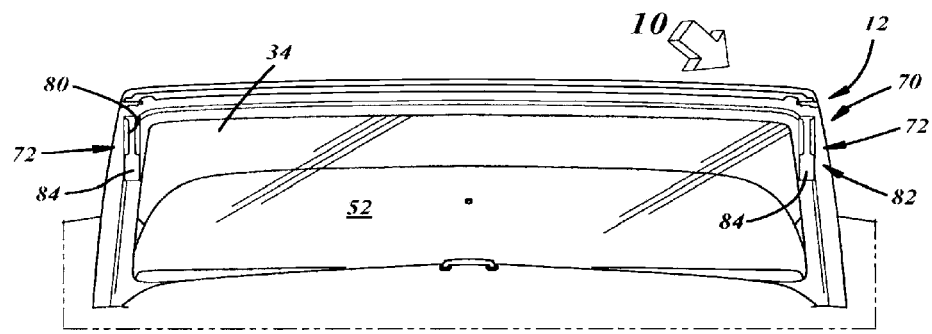
FIG. 9 is a view of an interior of the windshield.

To move the windshield 12 to its second position, the windshield is first released from the vehicle frame 16. To do this, one or more fasteners may be removed (such as bolts, which are not shown). Then, the links 44 are rotated about their second pivots 48 as shown in FIGS. 2-6, and that rotation is in a first direction which is generally counterclockwise as viewed in these figures. During this movement of the links 44, the windshield 12 may pivot relative to the links 44, about the first pivot 46. This permits the upper frame member 38 of the windshield 12 to remain generally adjacent to the windshield opening 14 while the lower frame member 36 of the windshield is moved away from the opening 14. This results in the windshield 12 pivoting about the first pivot 46 in a second direction which is opposite to the first direction and clockwise as viewed in FIGS. 2-6. Hence, the windshield assembly permits a compound movement of the windshield 12 relative to the vehicle 10. When the windshield 12 is in its second position, the upper portion of the windshield 12 (i.e. the portion adjacent to and including upper frame member 38) is closer than the lower portion of the windshield (i.e. the portion adjacent to and including lower frame member 36) is to the windshield opening 14, its inner surface 52 (FIGS. 9-10) is positioned facing the hood 20 and its outer surface 54 (FIGS. 1-2) is positioned facing outwardly, away from the hood 20. Also, the lower portion of the windshield is on the opposite side of the second pivots 48 than is the windshield opening 14, and the links 44 have also rotated from one side of the second pivots 48 (e.g. adjacent to the opening) to the other. The upper portion of the windshield 12 may be positioned between the second pivots 48 and the windshield opening 14 when the windshield 12 is folded down to its second position.

When the windshield pane 34 and/or its frame 32 has some curvature where its inner surface 52 is generally concave, the compound movement positions the concave inner surface 52 adjacent to the outer surface of the hood 20 which is generally convex. Thus, the windshield shape more closely approximates and better fits the shape of the hood compared to a windshield that is positioned with its inner surface facing outwardly, away from the hood when folded down.

Figure 6:
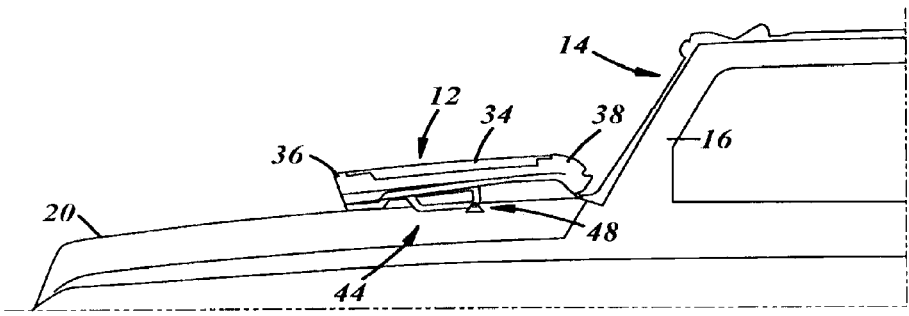
FIG. 6 is a side view of a portion of the vehicle showing the windshield in its folded down, second position.

In its fully stowed, second position as shown in FIGS. 1 and 6, the windshield 12 may rest on one or more support surfaces that keep the windshield from directly engaging the hood 20. The support surfaces may include any combination of features carried by the vehicle (e.g. hood 20), windshield 12 (e.g. the pane 34 or frame 32) or the links 44. In the example shown, the handles 50 of the links 44 extend generally perpendicularly from the hood 20 and provide a resting surface 56 upon which the windshield 12 is received, with the side members 40, 42 of the windshield frame 32 engaging a surface of the handles 50. One or more pads 58 may also be provided on the hood 20, as can be seen in FIGS. 2-5. Finally, a retainer 60 may be provided to releasably secure the windshield in its second position and prevent unwanted movement of the windshield. In the implementation shown, the retainer 60 includes a strap that spans the windshield 12 and is attached at both ends to the vehicle 10.

To return the windshield 12 to its first position, the retainer 60 is removed and the windshield 12 may be unfolded. To do this, the windshield 12 may be rotated about the first pivots 46 in one direction and the links 44 may be rotated about the second pivots 48 in a second direction opposite the first direction until the windshield 12 is returned to its first position. While fixed pivots may be used, the pivoted connections may also include some sliding movement between the link and the hood and/or windshield. Rotation in a direction other than the pivot may also be permitted, if desired, to facilitate positioning the windshield.

In addition to or instead of the fasteners that may be used to secure the windshield to the vehicle, a guide 70 may be used to position and retain the windshield in its first position. One example of a guide 70 is shown in FIGS. 7-10 and includes mating features on the vehicle and the windshield 12 that align and help secure the windshield 12 to the frame 16. In this example, the guide 70 includes a track 72 carried by the windshield 12 (e.g. the frame 32) and a follower 74 carried by the vehicle 10 adjacent to the windshield opening 14. One track 72 may be provided adjacent to each side of the windshield 12 and a follower 74 may be provided for each track 72. Because these components may be the same on each side of the windshield, only one track 72 and follower 74 will be described in detail.

Figure 7:
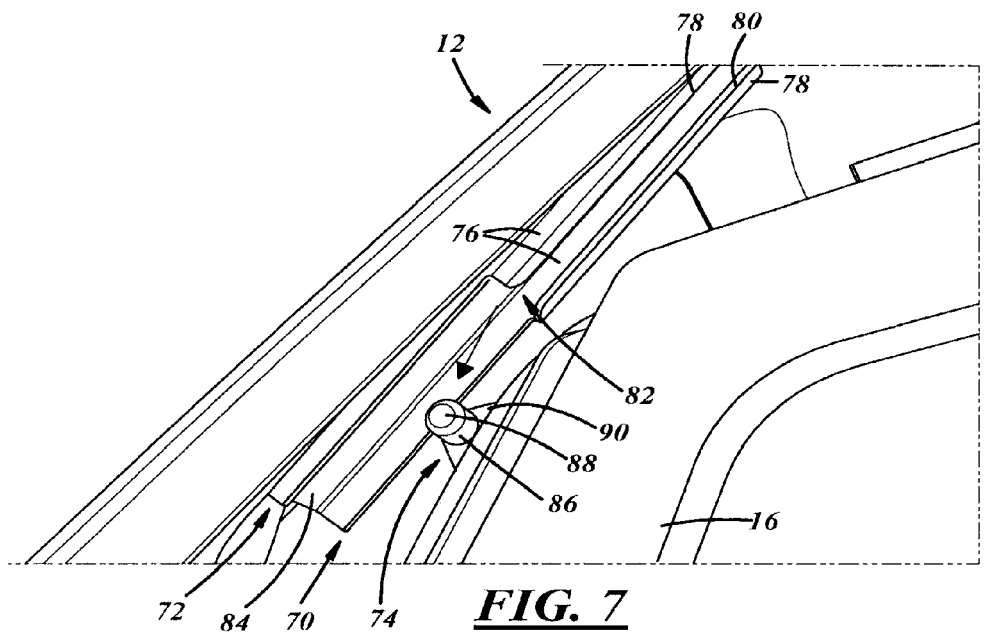
FIGS. 7 and 8 are fragmentary perspective views showing a guide assembly for the windshield.
Figure 8:
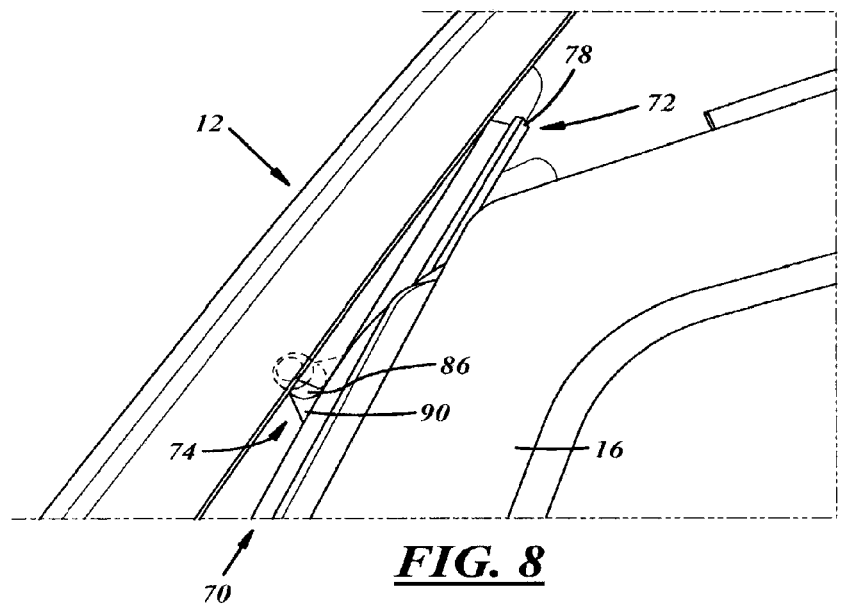

The track 72 may include a channel shaped member having two opposed sidewalls 76 and retaining flanges 78 that extend inwardly from the sidewalls 76 to define a slot 80 between them. While two flanges 78 are shown in the embodiment described, only one flange could be provided. The slot 80 may have a width that is less than the width of an entrance portion 82 outboard of and leading to the slot 80. The sidewalls 76 may be tapered so that they have a greater height (measured perpendicular to a base 84 of the track 72) adjacent to the entrance portion 82 than at a location (e.g. an end of the sidewalls 76) spaced from the entrance portion 82 and within the area of the slot 80, as shown in FIGS. 7 and 8. The slot 80 between the flanges 78 may also be narrower at a location spaced from the entrance portion 82 than at the entrance portion 82 to improve the lateral alignment between the side surfaces of the windshield 12 and the corresponding portions of the windshield frame 16. Hence, the track 72 may be tapered or otherwise varied in two directions to provide increasingly better alignment of the windshield 12 with the frame 16 in two directions, both lateral or side-to-side and also toward the vehicle.

Figure 10:
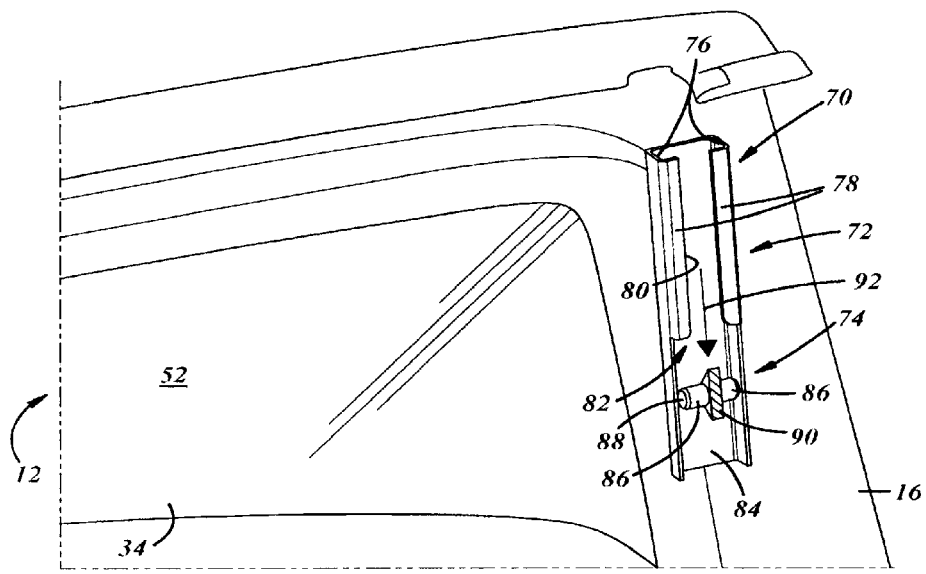
FIG. 10 is an enlarged view of a portion of the windshield taken in the direction of the arrow 10 in FIG. 9.

The follower 74 may include one or more pegs 86 that are generally aligned with each other and extend outwardly to define a width between their outer ends 88 that is less than a width between the track sidewalls 76 but greater than the width of the slot 80. The pegs 86 may be sized and shaped to fit relatively easily within the entrance portion 82 of the track 72, and between the sidewalls 76 and beneath the flanges 78 when the windshield 12 is in or near its first position. The pegs 86 may also be arranged for a desired relative movement between the track 72 and pegs during movement of the windshield 12. In that regard, the pegs 86 may rotate about a carrier 90 that holds them in place relative to the vehicle 10. The carrier 90 may extend between and hold the pegs 86 (the carrier and one or both pegs 86 may be formed from the same piece of material or separate pieces) and the carrier 90 may be received in the slot 80 when the pegs 86 are received beneath the flanges 78, as shown in FIG. 10.

As shown in FIG. 7, when the windshield 12 is moving toward its first position and the windshield is generally aligned with the windshield opening 14, the tracks 72 on the windshield 12 are generally aligned with their respective followers 74. Downward movement of the windshield 12 relative to the vehicle 10 (as shown by arrow 92 in FIG. 10) positions the pegs 86 within the entrance portion 82 and thereafter between the sidewalls 76 and beneath the flanges 78. The tapered sidewalls 76 provide a cam action as the windshield 12 is moved relative to the vehicle 10 that tends to pull the windshield 12 closer to the vehicle 10. This ensures a tight fit between the windshield 12 in its first position and the vehicle frame 16. When the windshield 12 is fully in its first position, the pegs 86 may be closely and snugly received between the flanges 78 and base 84 of the track 72. Thereafter, the fasteners, if provided, may be installed to further secure the windshield 12 to the vehicle 10.

When the guide track 72 and follower 74 arrangement is used, the links 44 may be designed to permit the windshield 12 to be lifted upwardly relative to the vehicle 10 to remove the follower(s) 74 from the guide track(s) 72. To do this, the links 44 are arranged so that a distance between the second pivot 48 and an upper edge 38 of the windshield 12 is less when the windshield is in its first position than at some time during the movement of the windshield from its first position toward its second position. This is illustrated by comparison of FIG. 2 with FIG. 3. While the guide track 72 is shown as being carried by the windshield 12 and the follower 74 is shown as being carried by the vehicle 10, they could be reversed so that the follower is carried by the windshield and the track carried by the vehicle.

Accordingly, the windshield 12 may be removably coupled to the vehicle 10 to permit an end user to move the windshield relative to its opening 14 and replace the windshield back in its position closing the opening 14. Further, the windshield may be stored in a position wherein its inner surface faces the vehicle and the outer surface is maintained facing outwardly.

What is claimed is:

1. A releasably mounted windshield assembly for a vehicle having a passenger compartment and a hood, comprising:
    a windshield with a lower edge and an upper edge and having a frame adapted to be releasably coupled to a vehicle and a transparent pane carried by the frame, the transparent pane has an inner surface defining part of the passenger compartment when the windshield is in a first position;
    a control mechanism coupled at one end to the vehicle and at its other end to the windshield, the control mechanism including a pivot that permits the windshield to move relative to the vehicle so that the inner surface of the windshield faces the vehicle when the windshield is in a second position, the lower edge is closer to the hood when the windshield is in its first position, the lower edge is spaced farther from the passenger compartment than the upper edge when the windshield is in its second position and the upper edge is closer to the hood when the windshield is in the second position than when the windshield is in the first position.

2. The windshield assembly of claim 1 wherein the frame is adapted to carry a seal or engage a seal carried by the vehicle, or both, when the windshield is in its first position.

3. The windshield assembly of claim 2 wherein the control mechanism permits the windshield to pivot relative to the control mechanism in a first direction and the control mechanism to pivot relative to the vehicle in a direction opposite to the first direction.

4. The windshield assembly of claim 2 wherein the control mechanism includes a link that is pivotably connected to the windshield adjacent to a lower edge of the windshield, where the lower edge is adjacent to the hood when the windshield is in its first position.

5. The windshield assembly of claim 1 wherein the windshield overlies the control mechanism when the windshield is in its second position.

6. The windshield assembly of claim 1 wherein at least a majority of the control mechanism is located outside of the passenger compartment when the windshield is in its first position.

7. The windshield assembly of claim 1 wherein the control mechanism includes a link that has at least one handle adapted to be manipulated to facilitate folding of the windshield from its first position to its second position.

8. The windshield assembly of claim 7 wherein the handle extends from a body of the link away from the hood when the link is in its first position, and the handle extends downwardly toward the hood when the link is rotated to its second position such that the handle spaces the body of the link from the hood.

9. The windshield assembly of claim 1 wherein the inner surface of the windshield engages the control mechanism when the windshield is in its second position.

10. The windshield assembly of claim 1 wherein the control mechanism includes two spaced apart links each connected to the windshield.

11. The windshield assembly of claim 1 which also includes a guide adapted to mate with a complementary component on the vehicle to control movement of the windshield when coupling the windshield to and decoupling the windshield from the vehicle.

12. A releasably mounted windshield assembly for a vehicle having a passenger compartment, comprising:

a windshield having an inner surface defining part of the passenger compartment when the windshield is in a first position;

a control mechanism coupled at one end to the vehicle and at its other end to the windshield, the control mechanism including a pivot that permits the windshield to move relative to the vehicle so that the inner surface of the windshield faces the vehicle when the windshield is in a second position, which also includes a guide adapted to mate with a complementary component on the vehicle to control movement of the windshield when coupling the windshield to and decoupling the windshield from the vehicle, and wherein the guide includes one of a track and a follower, and where the vehicle includes the other one of the track and follower so that the follower is received within the track when the windshield is coupled to the vehicle.

13. The windshield assembly of claim 12 wherein the track is tapered so that during movement of the windshield to couple the windshield to the vehicle the windshield is pulled closer to the vehicle by engagement of the follower with the track.

14. A releasably mounted windshield assembly for a vehicle having a passenger compartment, comprising:

a windshield adapted to be sealed to a portion of the vehicle to define part of the passenger compartment when in a first position and spaced from the passenger compartment when in a second position, the windshield having an upper portion and a lower portion and side surfaces extending between the upper portion and lower portion;

a control mechanism adapted to be pivotably connected at one end to the vehicle and pivotably connected at its other end to the windshield to permit the windshield when installed on the vehicle to move relative to the vehicle between its first and second positions so that the upper portion of the windshield is closer to the passenger compartment of the vehicle than the lower portion of the windshield when the windshield is moved to its second position and the upper portion of the windshield is closer to a hood of the vehicle in the second position than in the first position.

15. The windshield assembly of claim 14 wherein the control mechanism includes a link pivotally connected to the windshield and the vehicle and wherein the windshield may pivot relative to the link in a first direction and the link may pivot relative to the vehicle in a second direction.

16. The windshield assembly of claim 14 wherein the windshield includes an inner surface that defines part of the passenger compartment when the windshield is in its first position and wherein the inner surface is positioned facing the vehicle when the windshield is in its second position.

17. The windshield assembly of claim 16 wherein the inner surface is generally concave and the portion of the vehicle that the inner surface faces when the windshield is in its second position is generally convex.

18. The windshield assembly of claim 14 wherein the windshield includes an outer surface facing away from the passenger compartment when the windshield is in its first position and the outer surface faces away from the vehicle when the windshield is in its second position.

19. The windshield assembly of claim 14 wherein the windshield includes a frame adapted to be sealed to the vehicle in the first position of the windshield, and a transparent pane carried by the frame.

* * * * *